(12) United States Patent
Rencs

(10) Patent No.: US 9,817,682 B2
(45) Date of Patent: Nov. 14, 2017

(54) SYSTEM ARCHITECTURE FOR MACHINE VISION ON MOVING PLATFORMS

(71) Applicant: Goodrich Corporation, Charlotte, NC (US)

(72) Inventor: Erik V. Rencs, Carlisle, MA (US)

(73) Assignee: Goodrich Corporation, Charlotte, NC (US)

( * ) Notice: Subject to any disclaimer, the term of this patent is extended or adjusted under 35 U.S.C. 154(b) by 228 days.

(21) Appl. No.: 14/715,275

(22) Filed: May 18, 2015

(65) Prior Publication Data

US 2016/0342433 A1 Nov. 24, 2016

(51) Int. Cl.

| G06F 9/44 | (2006.01) |
|---|---|
| G06F 9/445 | (2006.01) |
| G01C 21/16 | (2006.01) |
| G06F 15/76 | (2006.01) |
| G06F 1/32 | (2006.01) |

(52) U.S. Cl.
CPC ....... *G06F 9/44505* (2013.01); *G01C 21/165* (2013.01); *G06F 9/44* (2013.01); *G06F 15/76* (2013.01); *G06F 1/32* (2013.01)

(58) Field of Classification Search
CPC ..... G06F 1/32; G06F 1/28; G06F 1/26; G06F 1/00; G06F 9/44
USPC ....... 713/300, 310, 320, 321, 322, 323, 324, 713/330, 340, 375
See application file for complete search history.

(56) References Cited

U.S. PATENT DOCUMENTS

| 5,970,510 A | 10/1999 | Sher et al. |
|---|---|---|
| 8,885,887 B1 | 11/2014 | Chen et al. |
| 9,024,972 B1 * | 5/2015 | Bronder ................ G06T 19/006 345/633 |

(Continued)

FOREIGN PATENT DOCUMENTS

| WO | WO-2015013418 A2 | 1/2015 |
|---|---|---|
| WO | WO-2015021074 A1 | 2/2015 |

OTHER PUBLICATIONS

Extended European Search Report from the European Patent Office dated Oct. 28, 2016 for Application No. EP16170210.

(Continued)

*Primary Examiner* — Jaweed A Abbaszadeh
*Assistant Examiner* — Keshab Pandey
(74) *Attorney, Agent, or Firm* — Locke Lord LLP; Scott D. Wofsy; Alexander Viderman

(57) ABSTRACT

A computer system for processing machine vision data and performing active control of a mobile platform includes a plurality of sensors configured to acquire inertial and positional data. The system further includes a first plurality of co-processors having a hardware logic configured to control the acquisition of the inertial data. A second plurality of sensors is configured to acquire image data related to the mobile platform. The system further includes a second plurality of co-processors having a hardware logic configured to control the acquisition of the image data. The system further includes state management logic to perform state management operations for the acquired inertial and positional data in a computer-readable memory. The state management is performed using a state vector. The state management logic coordinates sharing and updating the acquired machine vision data in a parallel fashion between the first and second co-processors.

14 Claims, 10 Drawing Sheets

(56) References Cited

U.S. PATENT DOCUMENTS

| | | | |
|---|---|---|---|
| 2006/0059317 A1* | 3/2006 | Kakeda | G06F 12/0833 |
| | | | 711/145 |
| 2010/0287357 A1* | 11/2010 | Vishkin | G06F 9/3851 |
| | | | 712/207 |
| 2011/0140916 A1 | 6/2011 | Kao | |
| 2011/0178708 A1* | 7/2011 | Zhang | G01C 21/165 |
| | | | 701/501 |
| 2012/0239905 A1* | 9/2012 | Barnes | G06F 9/54 |
| | | | 712/29 |
| 2012/0290146 A1 | 11/2012 | Dedes et al. | |
| 2015/0046675 A1 | 2/2015 | Barry et al. | |
| 2015/0067008 A1 | 3/2015 | Kamath et al. | |
| 2015/0354966 A1* | 12/2015 | Morin | G01C 21/165 |
| | | | 701/468 |

OTHER PUBLICATIONS

Fei Wang et al: "Design and Construction Methodology of an Indoor UAV System With Embedded Vision", Control Intelligent systems, Jan. 1, 2012 (Jan. 1, 2012), p. 201, XP055310165, DOI: 10.2316/Journal.201.2012.1.201-2310 Retrieved from the Internet: URL:http://vlab.ee.nus.edu.sg/~bmchen/papers/cis-2012.pdf [retrieved on Oct. 11, 2016].

\* cited by examiner

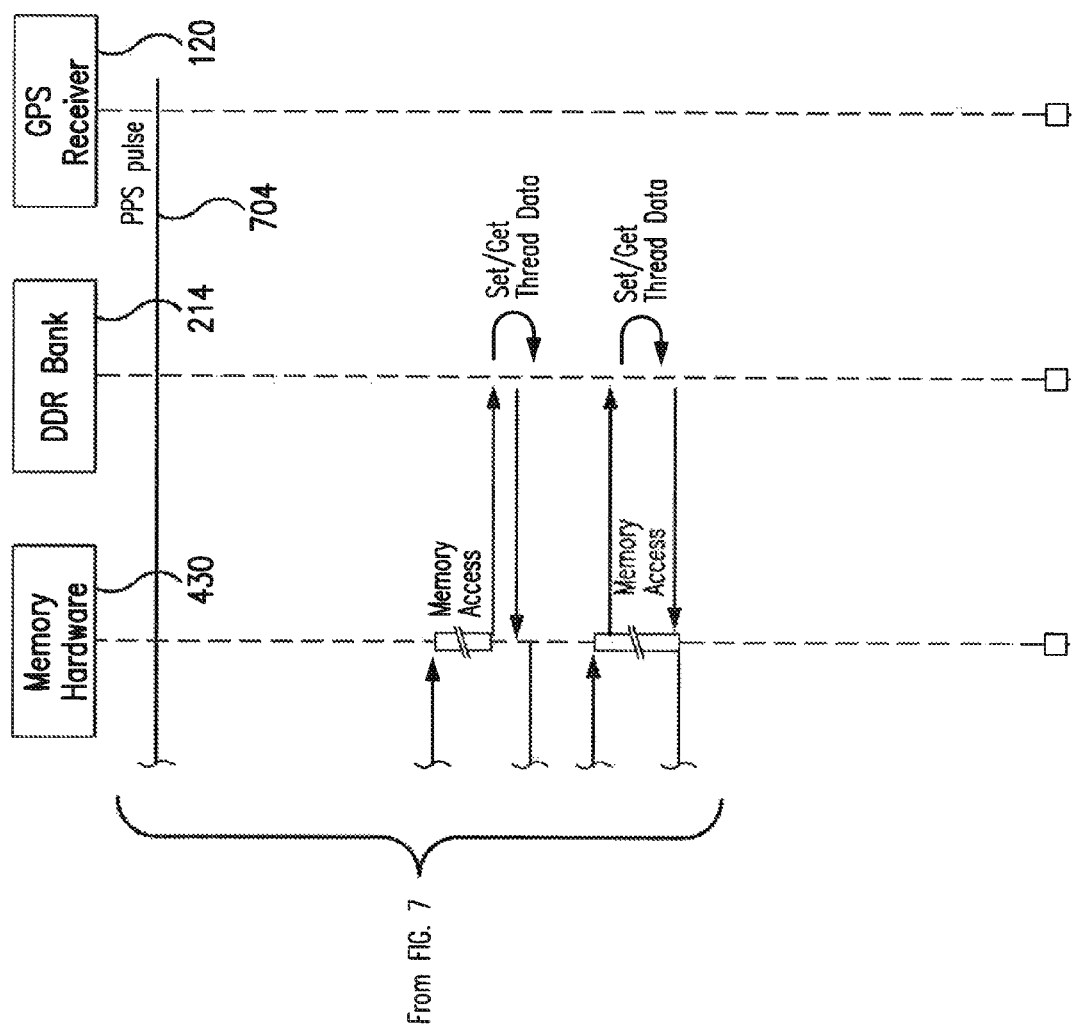

SYSTEM ARCHITECTURE FOR MACHINE VISION ON MOVING PLATFORMS

FIELD OF THE INVENTION

The present invention relates to intelligent mobile platforms, and more particularly, to system architecture for machine vision on mobile platforms.

BACKGROUND OF THE INVENTION

Machine vision systems for intelligent mobile platforms have been proposed in the past as a possible mechanism for object avoidance, object identification and mobile platform navigation. Typically, the systems utilize complicated components which attempt to calculate the distance from the mobile platform to an object and/or features of an object based on relative movement of the object through an array of pixels or voxels captured by a multi modal data capture device or sensor. At least in some cases, the mobile platforms consist of a computing engine, a plurality of physical sensors (i.e., gyroscopes, accelerometers, Global Positioning System (GPS) devices) and sensors that can form images or retrieve positional data (i.e., camera, lidar (light detection and ranging) sensors, etc.). Additionally, these mobile systems can have a plurality of electro-mechanical actuators that need to be controlled and may run one or more machine vision applications on the computing engine of the mobile platform. Typical image processing tasks performed by these machine vision applications include, but are not limited to, recording video, building mosaics, tracking features in the image, geo-location of the image and building 3D "world models" of the space surrounding the system. Typical control operations include, but are not limited to, navigating this 3-D space, performing tasks the system has been designed to perform, actively stabilizing the sensors for the best possible measurements and synchronizing active mobile platform controls with sensor data.

A majority of the aforementioned machine vision data processing tasks are computationally expensive, require high power, are error prone, difficult to program and difficult to run in real time. However, it is noted that the faster the mobile platform can move the more precise positioning data needs to be. Precision of the individual system components is typically a linear function with respect to timing uncertainty. The linear errors of individual components contribute to system errors in complex ways, typically, random, chaotic and nonlinear. Accordingly, deterministic timing is of paramount importance.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, an integrated system for processing machine vision data and performing active control of a mobile platform is provided. The computing system includes a first plurality of sensors configured to acquire inertial and positional data related to the mobile platform. The computing system also includes a first plurality of co-processors communicatively coupled to the first plurality of sensors. The first plurality of co-processors includes a hardware logic configured to control the acquisition of the inertial and positional data and configured to analyze the acquired inertial and positional data. The computing system further includes a second plurality of sensors configured to acquire image data related to the mobile platform. In addition, the computing system includes a second plurality of co-processors communicatively coupled to the second plurality of sensors. The second plurality of co-processors includes hardware logic configured to control the acquisition of the machine vision data and configured to analyze the acquired image data. The computing system further includes a plurality of arrays of memory blocks for storing the acquired image data. The computing system also includes state management logic to perform state management operation for the acquired inertial and positional data in a local memory. The state management operation is performed using a state vector. The state management logic coordinates sharing and updating the acquired inertial and positional data in a parallel fashion between the first and second plurality of co-processors. The computing system also includes a plurality of memory controllers configured to control access to the plurality of arrays of memory blocks. The plurality of memory controllers are communicatively coupled to the second plurality of co-processors and communicatively coupled to the state management logic.

In another aspect an integrated system for processing machine vision data and performing active control of a mobile platform includes a first plurality of sensors configured to acquire inertial and positional data related to the mobile platform. The computing system further includes a second plurality of sensors configured to acquire image data related to the mobile platform. Additionally, the computing system includes a system on chip. The system on chip includes a first plurality of co-processors communicatively coupled to the first plurality of sensors. The first plurality of co-processors includes a hardware logic configured to control the acquisition of the inertial and positional data and configured to analyze the acquired inertial and positional data. The system on chip further includes a second plurality of co-processors communicatively coupled to the second plurality of sensors. The second plurality of co-processors includes hardware logic configured to control the acquisition of the image data and configured to analyze the acquired image data. The system on chip also includes state management logic to perform state management operation for the acquired inertial and positional data in a local memory. The state management operation is performed using a state vector. The state management logic coordinates sharing and updating the acquired inertial and positional data in a parallel fashion between the central processing unit, first and second plurality of co-processors. The computing system also includes a plurality of arrays of memory blocks for storing the acquired machine vision data. The plurality of arrays of memory blocks is external to the system on chip.

BRIEF DESCRIPTION OF THE DRAWINGS

So that those having ordinary skill in the art, to which the present invention pertains, will more readily understand how to employ the novel system and methods of the present certain illustrated embodiments, the embodiments thereof will be described in detail hereinbelow with reference to the drawings, wherein.

DETAILED DESCRIPTION OF CERTAIN EMBODIMENTS

Figure 1:
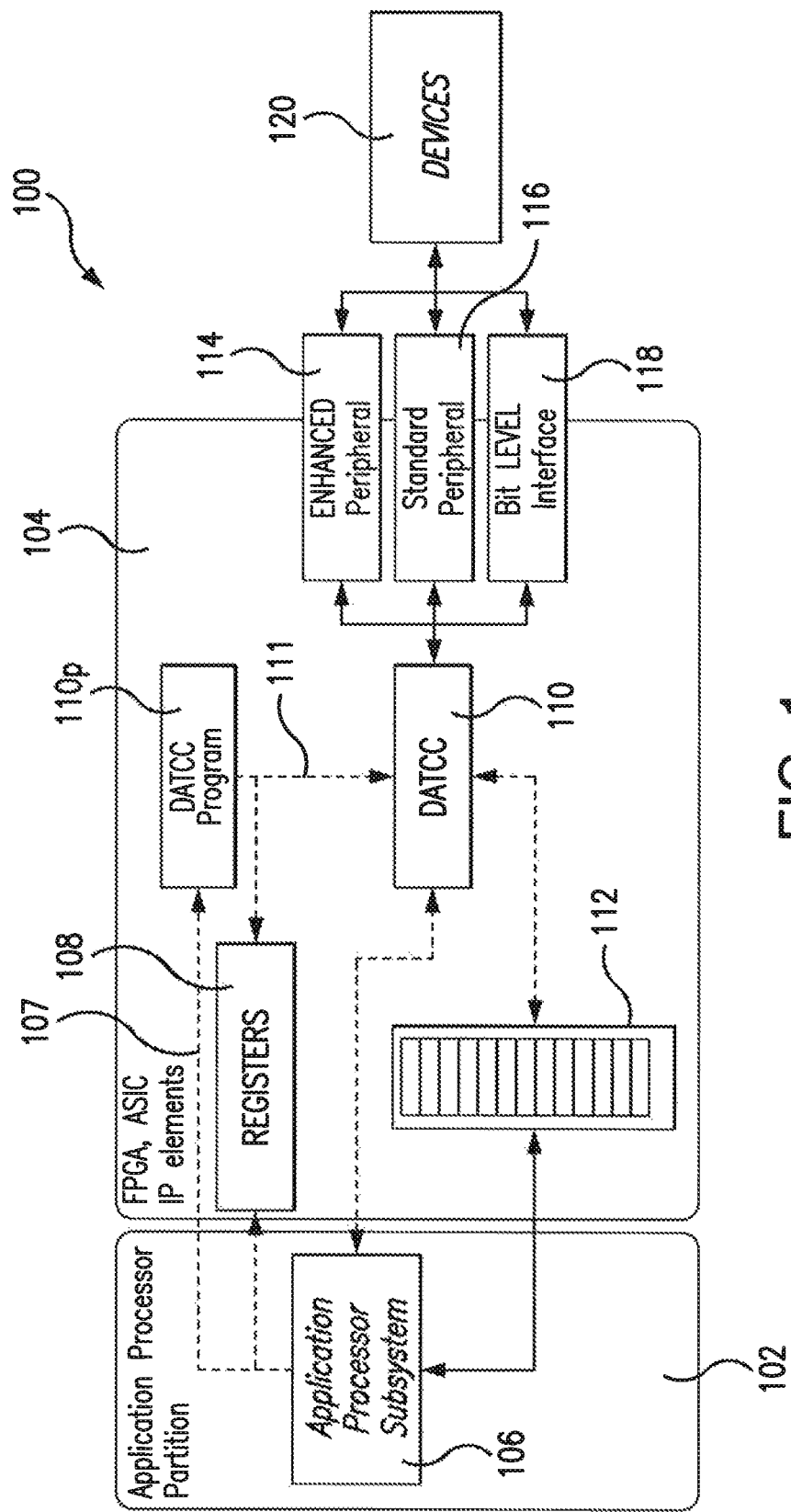
FIG. 1 is a simplified system diagram illustrating a coprocessing relationship in the sub-system architecture which includes a co-processor designed to receive and process acquired inertial and positional data, in accordance with an embodiment of the present invention.

The below described embodiments are directed to a customized architecture of an embedded machine vision system on mobile platforms utilizing System on Chip (SOC) technologies that accurately collects vast amounts of sensor data (inertial, positional and image, radar data), calculates the position and pose of the sensors and system body and distributes this accurately collected sensor and control data to a system of coprocessors located on the SOC. In general, knowledge of the sensor orientation and position in relative time and space is very computationally advantageous to solve the generic machine vision problems existent with moving platforms. The addition of absolute positional knowledge significantly improves capability of the mobile platform. Various embodiments described herein address architectural improvements that enable simpler and more accurate local and global orientation of the mobile platform.

It is to be appreciated that the below described embodiments are not limited in any way to what is shown in the Figures, and instead, can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

As used herein, the term "mobile platform" may refer to any vehicle with or without an on-board human pilot. For example, mobile platform may include, but are not limited to, Unmanned Aerial Vehicles (UAVs), fixed-wing UAVs, rovers, walking robots, hovercraft, submersibles, and surface vehicles, gimbaled stabilized sensor platforms and fixed image, radar platforms. The term "mobile platform" is also intended to refer to any portable electronic device such as a cellular telephone, smart phone, tablet computer, or other wireless communication device, virtual reality goggle, personal communication system (PCS) device, personal navigation device (PND), Personal Information Manager (PIM), Personal Digital Assistant (PDA), or other suitable mobile device. Any operable combination of the above are also considered a "mobile platform."

The term "sensor" is used herein in a broad sense and includes any type of physical sensor or controller, such as a GPS receiver, gyroscope, accelerometer, motor controller, as well as a device for measuring temperature, current, voltage, ADC (Analog to Digital Converter), DAC (Digital to Analog Converter), Digital IO, or the like. The term "image sensor" encompasses any type of image capturing device such as a video camera, radar, lidar, FLIR (forward looking infrared imaging) sensor, or any combination of such sensors. The term "image sensor" is also inclusive of multi-spectral imagers and groups or arrays of the same or different image capture devices. A sensor may capture information in a series of two or three dimensional arrays. The image sensor may include both active and passive cameras.

As used herein, the term "processor" is to be broadly construed to include any type of embedded processor.

As used herein, the term "SPI interface" refers to any component that converts commands and other types of communications from a standard Serial Peripheral Interface (SPI) format to another electrical or physical or information format. Examples of such SPI interfaces include, but not limited to, SPI to Controller Area Network ("CAN"), SPI to digital-to-analog ("D/A") converter, SPI to mirror scan angle, SPI to Gyroscope Data, and the like.

As used herein, the term "SPI Cluster" refers to a set of collocated SPI interfaces that share a SPI cluster electrical interface with one SPI controller.

The term "assert" is used herein to refer to pushing a computer value to a physical machine vision system.

Typical machine vision systems include pluralities of computing elements, operating systems, physical sensors (i.e., image forming sensors, gyros, accelerometers, GPS), application software and actuation controllers. In a nutshell, a machine vision system works by querying the physical sensors at defined intervals, decoding the sensor feedback, estimating where in space the system is and where it is pointing, synchronizing the capture of the image forming data and collecting all of this information in digital memory. Typically, one or more application components perform each step of this data collection. Then the application software typically runs complex routines that take the image and physical sensor data to create an output. Additionally, the active control elements of a vision system mounted on a mobile platform typically need to react to real world disturbances as detected by the wide modality of sensors. These machine vision systems are challenged by deterministic behavioral needs exhibited by various components of a distributed system. The distributed nature of the system presents several challenges. Typically, there is a digital controller in the system that collects the sensor information and determines how to respond to this information contingent on the tasks the system intends to perform. Additionally, the machine vision system can have a plurality of electro-mechanical actuators that need to be controlled.

Referring now to FIG. 1, there is illustrated a co-processor designed to receive and process acquired inertial and positional data, in accordance with an embodiment of the present invention. In one embodiment, a machine vision system mounted on a mobile platform 100 preferably comprises a conventional multi-core application processing system (partition) 102 which includes logical partitions 104 that have respective customized DATa Collection and Control (DATCC) processor cores 110 and memory areas 108 for programs, such as program 110$p$ described below. In several embodiments, the processing circuitry shown in FIG. 1 is implemented using SOC with programmable logic components (e.g. field programmable gate array (FPGA), or complex programmable logic device (CPLD)). In another embodiment, data vision processing circuitry 100 is implemented using any number of discrete logic components. In yet another embodiment, data vision processing circuitry 100 is implemented using an application specific integrated circuit (ASIC). It should be noted that application processor logical partition 102 is a conventional IP (intellectual property) component, while IP core 104 is unique and customized.

System 100 illustrated in FIG. 1 includes an application processor logical partition 102 having a computing device's application processor(s) 106, first co-processor logical partition 104 having one DATCC co-processor 110 and a plurality of sensors 120 attached to a single DATCC co-processor 110. Logical partitioning divides hardware resources so that separate DATCC 110, memory areas 108, 110$p$ and I/O ports 114,116,118 are allocated to the different partitions. The multi-core processor system 102 may run application codes in the same operating system (OS) and may be scheduled to run a code in parallel, symmetrical multi-processing mode (SMP). In the architecture illustrated in FIG. 1 application processor subsystem 106 is primarily responsible for executing one or more applications.

It is contemplated herein that application processor 106 may communicate with co-processor partition 104 via a set of registers 108, referred to hereinafter as register interface, and/or any other method known in the art. The inter-core communications may be coordinated by safe data exchange mechanisms, such as exist in operating systems (i.e., Linux).

It is noted that a plurality of sensors 120 collect variety of inertial and positional data related to the mobile platform. In one embodiment, the position, velocity, and angular orientation of the mobile platform may collectively be referred to as state vector parameters. According to an embodiment of the present invention, the state vector parameters are stored in state vector module 112 comprising a protected and managed read-write memory having a plurality of addressable memory locations. In one implementation, state vector module 112 is situated in the reconfigurable memory fabric shared by all elements in the co-processor logical partition 104. State vector memory 112 implemented as protected and managed multi port random access memory ("RAM") enables concurrent processing from the complete set of processors implemented in a particular mobile platform system. Advantageously, state vector module 112 further includes state management logic to perform state vector management operations for the acquired inertial and positional data. According to an embodiment of the present invention, the state management logic coordinates sharing and updating the acquired inertial and positional data in a concurrent fashion between application processor subsystem 106 and one or more co-processors described below. For example, if the state management logic uses separate read and write ports to access the state vector memory, then a triple-port RAM may be used instead of a dual-port RAM, with the third port being reserved for write access by the state management logic when a state vector read is locking memory access, for example, under debug or error conditions. According to an embodiment of the present invention, the DATCC 110 and other co-processors of the system are assigned time slices by state management logic around which data from state vector module 112 is read and written. The state management logic utilizes one entity write access and multiple entity read access logic. It is noted that the hardware logic of the coprocessors implements these interfaces natively.

In one embodiment, DATCC co-processor 110 is configured to perform navigation calculations and system mobility assertion and control functions. In addition, DATCC co-processor 110 may be configured to actively collect auxiliary data to and from other system components, such as motor controller components 220 and INS (Inertial Navigation System) components 228 (described below in conjunction with FIG. 2) for instrument control purposes. For ease of discussion, the term "inertial and positional data" encompasses such auxiliary data collected from other integrated components, such as motor controller 220 and INS 228. In one embodiment, DATCC co-processor 110 executes specific microcode instructions contained in a particular DATCC program 110$p$. The DATCC interface (described below) to the state vector module 112 is critically important and the state vector module 112 is a mechanism through which data is asserted to devices/sensors and results are stored. As an example, the DATCC co-processor 110 may run a program that writes a torque value to the motor controller 220. The DATCC program reads a specific memory location of the state vector memory, packages the retrieved value into the correct digital stream output and automatically sends this stream to the motor control device 220.

While only a single DATCC co-processor 110 component is shown in FIG. 1 for ease of illustration, alternative embodiments are contemplated in which any number and combination of DATCC co-processors 110 can be coupled to application processor partition 102. This number is of course limited by the size and layout of the integrated circuit used in logical co-processing partition 104. For example, such logical partition 104 on a mobile platform may include more than 10 DATCC co-processors 110 with 10 programs 110$p$ and ten register interfaces 108 coupled to application processor partition 102. It is noted that in such embodiments the plurality of DATCC processors 110 are situated within SOC fabric (depicted as co-processing partition 104 of subsystem 100) and act to serialize a plurality of signals that are then easily distributed physically within the mobile platform. In an illustrative embodiment, the plurality of control signals communicated between the pluralities of DATCC coprocessors 110 may replace several hundred connections in a conventional mobile platform system with a few serial communications lines. Advantageously, the disclosed architecture simplifies wiring, removes interrupt and serial communications processing from the application processor partition 102 and offers deterministic behavior regardless of implemented application programming.

It is contemplated herein that DATCC co-processor 110 may operate in at least five different modes. In one embodiment these modes may include, but are not limited to, reset, sleep, chirp acquisition, runtime and init modes. The reset and sleep modes are conventional modes well-known in the art. The chirp acquisition mode comprises an operating mode configured to wake up DATCC co-processor 110 from the sleep mode and execute microcode instructions in DATCC program 110p a single time.

The runtime mode is an operating mode that executes instructions contained in DATCC program 110p which may be loaded via runtime mode pathway 111. These instructions may include read/write commands from/to state vector module 112 and/or register interface 108. In one embodiment, DATCC program 110p is configured and operable to acquire inertial and positional data at predetermined collection-time intervals from the variety of sensors 120 mounted on mobile platform system 100. It is noted that DATCC co-processor 110 comprises a component dedicated to data transfers between the sensors 120 and the state vector module 112. Advantageously, DATCC co-processor 106 relieves application processor 106 of having to oversee the mass data transfer and significantly simplifies interrupt handling requirements for application processor 106, without any loss of efficiency, flexibility and/or extendibility. In one exemplary embodiment, the inventors hereof have observed approximately 20-100 fold interrupt reduction and approximately 0.4 Gbit/sec data movement load removal, as compared to application processor workload in conventional machine vision systems.

In one embodiment, the init mode may run an initialization routine (initialization code) which enables application processor 106 to communicate with devices 120 directly in a so-called "pass-through" mode. Initialization code may be generated by a high-level language compiler into the embedded system programming. In one embodiment, there is an initialization path 107 between a memory component storing DATCC code 110p utilized during runtime mode and application processor 106. The length of the initialization code may be substantial and, in some examples, the initialization code can be similar in length or may even substantially exceed the main code (i.e., DATCC program 110p). The initialization code may include code used for testing, profiling, debugging, etc. In other words, in an embodiment, DATCC code 110p should be limited to simple and repetitive data flows performed in runtime operating mode, while the initialization code may include substantially complex initialization, testing and debug interfaces. Such arrangement provides more efficient resource utilization.

Still referring to FIG. 1, the plurality of sensors 120 may be connected to one or more co-processor partitions 104, via a plurality of interfaces 114-118. In various embodiments, sensors 120 may provide and receive digital communication, provide and receive serial communication, provide analog input that needs to be converted to digital format, receive analog output that has been converted from digital format, provide temperature readings, and the like. In one exemplary embodiment, the plurality of interfaces may include bit level interface 118, standard peripheral interface 116 and enhanced peripheral interface 114.

The set of functions in bit-level interface 118 manipulate selected ones of the transmitted bits, based on the type of the external sensor 120. Bit-level interface software is generally understood by those skilled in the art. For example, bit-level interface software has been provided with the XC6200 series FPGA from XILINX.

Examples of well-known in the art standard peripheral interfaces 116 may include but not limited to IEEE1394, also referred to as FireWire, Universal Serial Bus, commonly referred to as USB, and the like.

At least some of sensors 120 may utilize enhanced peripheral interface 114. This type of serial communication is typically high speed, low power and may be converted to the device specific interface at a particular sensor 120. Enhanced peripheral interfaces 114 typically allow to minimize pincount and power consumption and provide timing skew compensation for synchronous serial interfaces.

Figure 2:
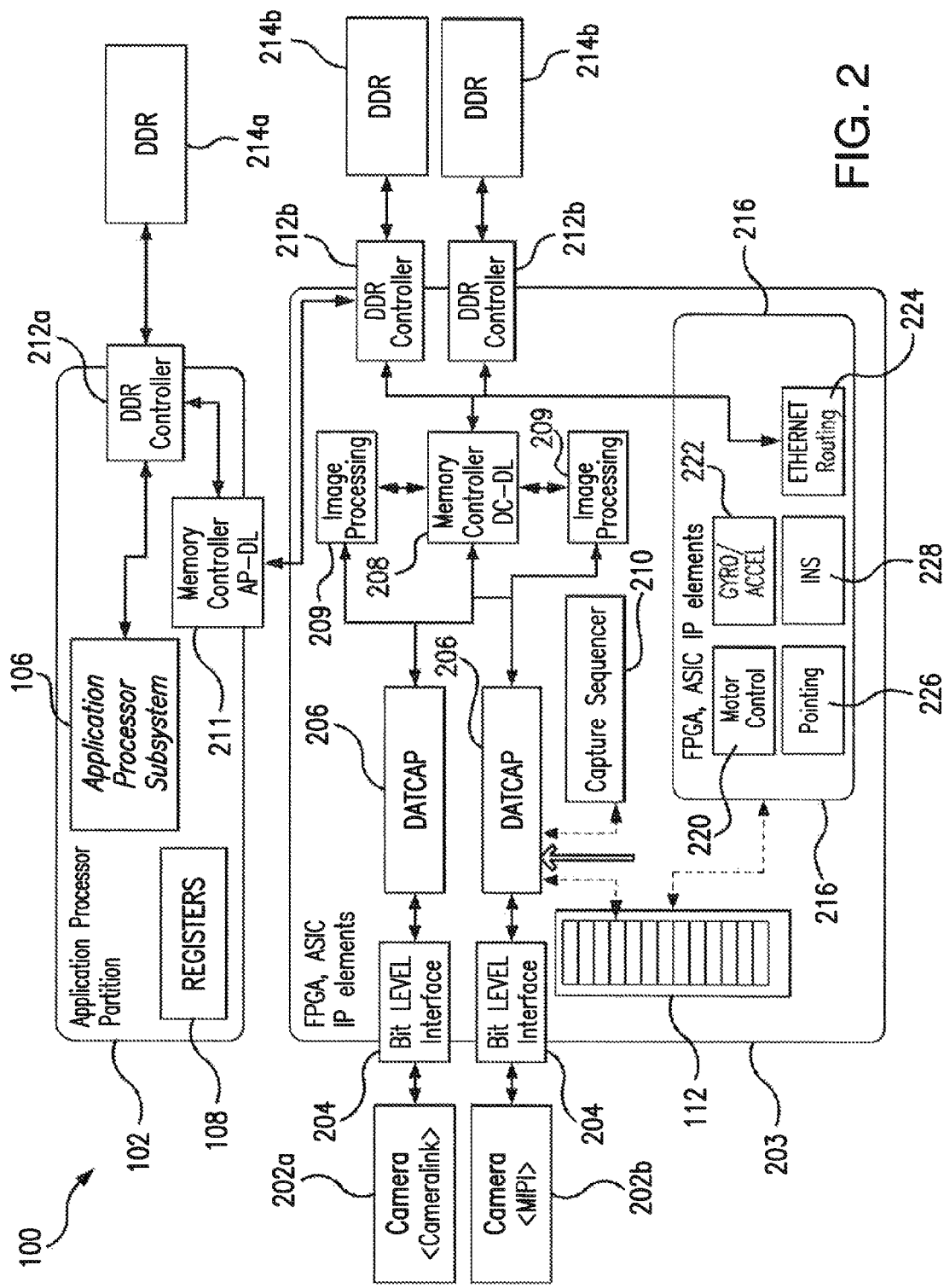
FIG. 2 is a simplified system diagram illustrating a coprocessing relationship in the sub-system architecture which includes a co-processor designed to receive and control the acquisition of large volume of image data received from external sensors, in accordance with an embodiment of the present invention.

FIG. 2 is a simplified system diagram illustrating a coprocessing relationship in the sub-system architecture which includes a co-processor designed to receive and control the acquisition of large volume of image data received from external sensors, in accordance with an embodiment of the present invention. System 100 illustrated in FIG. 2 includes an application processor logical partition 102 having a computing device's application processor(s) 106, second co-processor logical partition 203 having one or more customized co-processors and a second plurality of sensors 202 attached to second co-processor partition 203. In several embodiments, various circuitry components shown in FIG. 2 may also be implemented using FPGAs, CPLDs, ASICs and/or any number of discrete logic components. It is contemplated that in the illustrated embodiment, register interface 108 utilized for inter-partition communication is disposed within the application processor partition 102.

In a number of embodiments, the second plurality of sensors 202 attached to second co-processor partition 203 comprises image sensors such as cameras 202a and 202b, which may be configured to transmit image data via an interface format. The captured image data is transmitted in accordance with the interface format as a packet. These packets can be adapted to accord with any interface format, including but not limited to the Mobile Industry Processor Interface Alliance (MIPI) CSI-2 interface format (MIPI interface format), CameraLink interface format, a USB interface format, or a Firewire interface format.

In accordance with an embodiment of the present invention, the co-processor partition 203 includes one or more co-processors 206, referred to hereinafter as DATCAP co-processors, configured and operational to perform ingestion of high-bandwidth image data in a substantially standard manner. In an embodiment of the present invention, each of the DATCAP co-processors 206 is communicatively coupled to each of the second plurality of sensors 202. Furthermore, DATCAP co-processor 206 is coupled with state vector module 112 comprising the state management logic described above. As shown in FIG. 2, in some embodiments, image data received from the devices 202 may be converted by bit-level interface 204 into appropriate format. In several embodiments, image data from the plurality of cameras 202a-202b can be packetized by DATCAP 206 by inserting the image data and/or additional data describing the image data into a packet in such a way that application processor 106 can reconstruct images of a scene from the received image data and utilize additional system information related to the reconstructed images. This process of insertion of additional data describing the image data transmitted by cameras 202 is referred to hereinafter as metatagging. This additional data is provided by the state vector module 112 as described below. The image is typically rectangular and has four corners and corresponds to an image space. Examples of metadata inserted by DATCAP 206 include, without limitation, earth coordinate positions of a location at which the image was taken, data indicating the geo-location coordinates for the points in the Earth-Centered Earth-Fixed and/or north/east/down coordinate system corresponding to the four corners of the image and one or more timestamps (e.g., timestamps from GPS, timestamps from the machine vision system) indicating when an image was taken (e.g., date and time), information indicating whether the mobile platform was accurately stabilized at the time the image was taken, any detected error conditions, and the like.

It is noted that metatagging performed by DATCAP co-processor 206 and state management logic (state vector module 112) rather than by application processor 106 makes the process highly accurate. Furthermore, this embodiment of the present invention provides a way to perform metatagging by a dedicated co-processor thus neglecting effects of jitter induced by operating system scheduling or other specific programming and/or multithreaded conflicts and thus allowing both high performance and optimal accuracy without the expense and error of software based synchronization. Since each DATCAP processor 206 is a separate physical entity in the chip, the disclosed architecture easily scales to multiple sensors with complex and varied timing requirements. In one embodiment, the metatags inserted by DATCAP co-processor 206 include data that may be used to provide additional information for an image/data processing function later in the processing pipeline in a parallel fashion. In one embodiment, DATCAP co-processor 206 may achieve this by copying the needed metatags into the data stream of image data received from sensors 202 and by utilizing customized hardware logic for the data localization needed for parallel processing.

Still referring to FIG. 2, it is noted that the size of the data flow (i.e., video, LIDAR, camera data) ingested by several complex DATCAP co-processors 206 precludes the use of the state vector multiport memory for storage due to technical limitations (i.e., size of the on-chip memory in state vector module 112). According to an embodiment of the present invention, the computing system shown in FIG. 2 further includes multiple physically separate arrays (banks) of relatively large off chip memory. In various embodiments this memory may comprise at least one of flash memory, dynamic random access memory (DRAM), 4×DDR (dual data rate) memory, or the like. With respect to application processor 106, it is noted that the application processor's operating system 106 is communicatively coupled to a physically separate block of off chip storage 214a. The application processor 106 might run a conventional operating system (e.g., Linux) and may use a variety of memory management components, including, but not limited to, standard cache, DDR controllers 212a, Linux memory management, thread context, multicore memory management. According to various embodiments, the mobile platform described herein may utilize a plurality of other large off chip memory systems. Advantageously, this approach enables movements of large items of data to and from various memory components without application processor's 106 involvement and helps to avoid various core memory conflicts. For simplicity of discussion and illustration, these multiple banks of memory utilized for storage of machine vision data are referred to hereinafter as DDR banks 214.

Various embodiments of the present invention utilize separate DDR arrays 214b that are directly controlled and scheduled by a plurality of DDR controllers 212b also included in second co-processor logical partition 203. As illustrated in FIG. 2, the movement of data from the DATCAP 206 is bifurcated offering two distinct paths. One path is to a particular DDR controller 212b via the memory controller 208 that controls routing of data to the variety of programmable memory locations with available DDR banks (bank is combination of 212 and 214). In addition, the memory controller 208 also controls a plurality of image processing pipeline components 209 where metatagged data is pipelined from stage to stage in the image processing pipeline flow, according to an embodiment of the present invention. The memory controller 208 prefetches data for the image processing pipeline components 209 from the DDR locations 214b via a corresponding DDR controller 212 and loads "lines or strides" of auxiliary data needed by the image processing components 209 for the pipeline in addition to the image data originating from the DATCAP 206. In an embodiment of the present invention, a stride may comprise a row of pixels of a corresponding image. The image processing components 209 perform complex mathematical manipulation of this large size ingested data in a power efficient, deterministic manner. According to an embodiment of the present invention, the image processing components 209 may perform large computations that rely on positional and multimodal data for a plurality of conventional calibration, alignment and projection functions that are typically performed by machine vision systems. Non-limiting examples of such functions include, NUC (non-uniformity corrections), homographic affine projection of data, Lidar data binning, histogramming, aligning data functions and the like. Some of these functions are large and/or complex with regard to data movement scale and data correction while other functions are computationally expensive, difficult to program due to large interrupt count and requirements of deterministic behavior for control and measurement accuracy. These novel image processing components 209 are not general purpose and offer interfaces and programmability that are specific to tasks present in various machine vision applications and interfaces for moving platforms that work cooperatively on a single chip and that offer basic functions needed for these applications in a power and space efficient manner.

In an embodiment of the present invention, DDR controllers 212 are configured to schedule access to a variety of DDR memory arrays 214. This type of arrangement allows DATCAP co-processor 206 to stream data to DDR banks 214 without burdening the application processor 106 with any substantial involvement. As previously noted, DATCAP co-processors 206 also have access to the state vector module 112. Advantageously, the hardware arrangement illustrated in FIG. 2 enables DATCAP co-processors 206 to synchronize image data deterministically with the state vector data and store this synchronized machine vision data deterministically to DDR arrays 214b and/or feed the synchronized data to the image processing components 209. Various embodiments of the present invention contemplate that DATCAP co-processors 206 are configured to store the state vector data aligned with the large size image data in convenient chunks, making it easy to gather, record and send complete system states of machine vision system to any digital device. Furthermore, DATCAP co-processors 206 offload metatagging and data capture and movement tasks from application processor 106, thus relieving application processor's 106 workload and bandwidth.

According to an embodiment of the present invention, DATCAP co-processors 206 may be communicatively coupled to capture sequencer component 210. The capture sequencer component 210 may be configured to sequence the image data based at least in part on state vector values and/or other control signals (i.e., control signals provided by application processor 106 via register interface 108).

Figure 8:
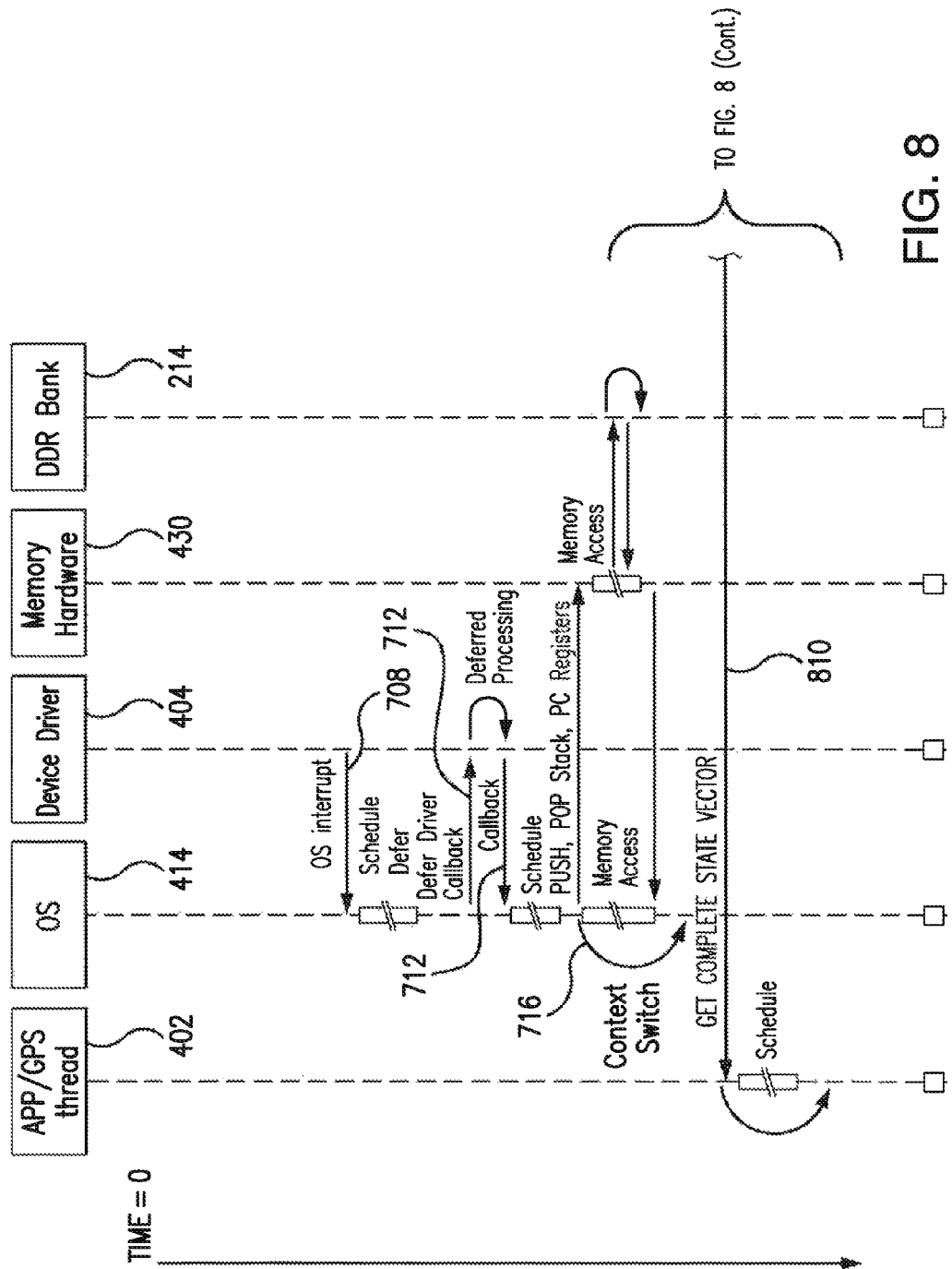
FIG. 8 illustrates the novel approach for data acquisition in the SOM of FIG. 5 that frees an application processor from the workload related to data acquisitions, in accordance with an embodiment of the present invention.
Figure 8:
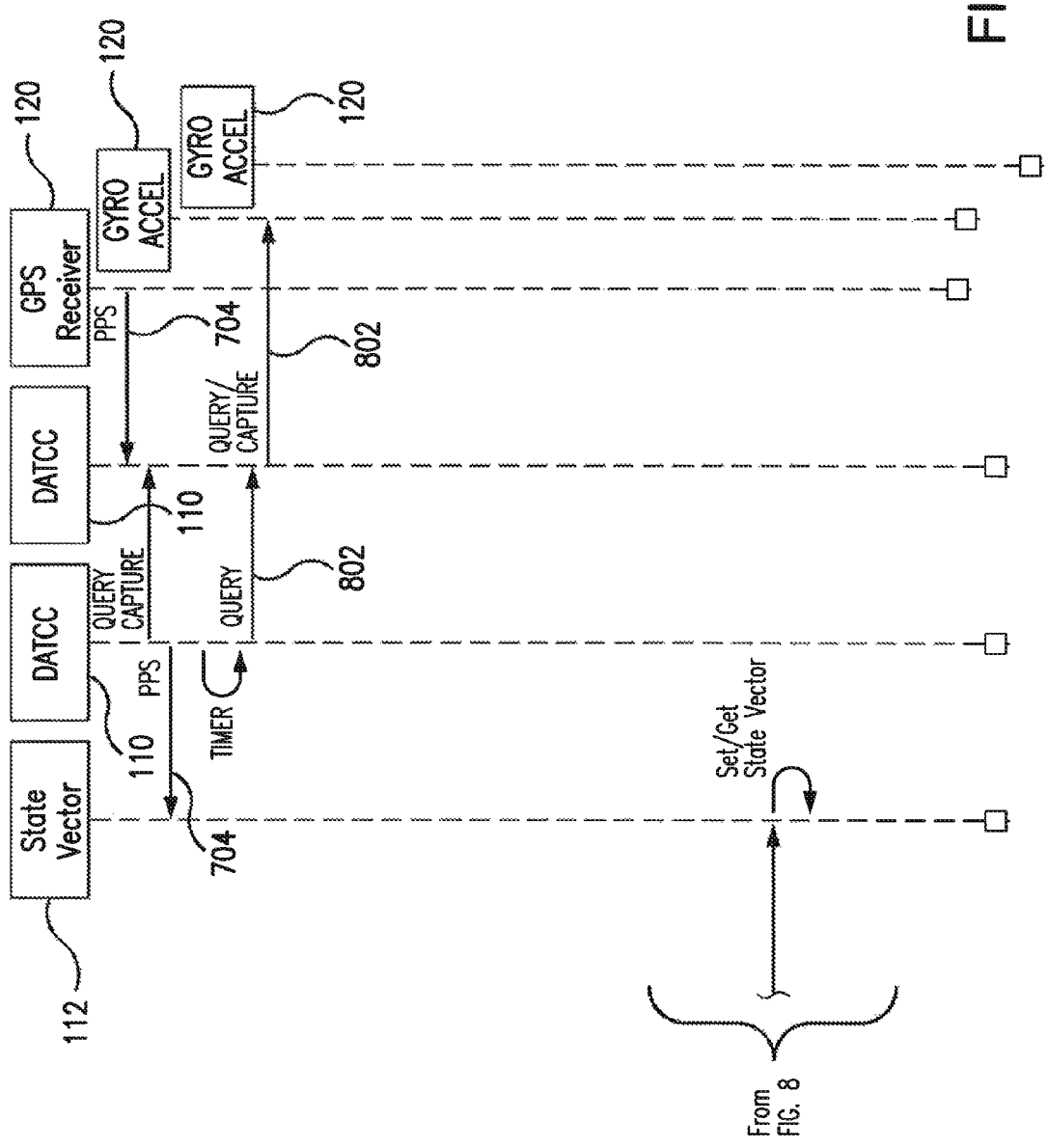

Advantageously, the system state vector management logic of the state vector module 112 is constructed in a customized memory implementation and provides defined, deterministic performance with respect to update and query of data contained in state vector module 112. In one embodiment, DATCAP co-processors 206 receive state vector data from state vector module 112 using safe/non-blocking memory asserts. Advantageously, the state vector memory of the state vector module 112 is designed to be both multi-ported and non-blocking. Consistency of the state vector is defined by an immutable copy of the state vector data that is not corrupted by the parallel update mechanisms during system use of each data element. Consistency means that all system elements have access to the same immutable copy of the state vector data simultaneously without blocking behavior. In other words, DATCAP co-processors 206 or any other component of digital logic partition 203 can simply query the update value of any state vector memory location with consistent, deterministic performance. Furthermore, the illustrative embodiment depicted in FIG. 2 also places the sensor interface complexity into the customized logical partition 203 thus freeing up the application processor 106 from the burden of computing it had previously done. As a result, application processor 106 no longer needs to handle interrupts related to various device interfaces as illustrated in FIG. 8 below. This greatly simplifies the programming model and simplifies the creation of robust device library (API) for all of the sensors (devices) on a mobile machine vision platform.

The memory controllers 208 depicted in FIG. 2 may comprise digital circuits that manage the flow of image data going between DDR arrays 214 and DATCAP coprocessors 206, image processing pipeline elements 209, the Ethernet routing component 224 and application processor's memory controller 211. In various embodiments, memory controllers 208 enable data streaming to various image processing components 209 and/or enable direct storage of image processing results to DDR SRAM arrays 214*b* as described above.

Advantageously, in various embodiments, memory controller 208 may be programmed to meet application specific needs, dependent on specific image data provided by the second plurality of sensors (i.e., image sensors) 202 and dependent on data processing steps allocated to the hardware logic of image processing components 209. For example, it is contemplated that a mobile platform is typically an integrated platform with known types of fixed cameras and IMU (Inertial Measurement Unit) instruments as well as known calibration needs and software modules. In some embodiments, memory controllers 208 can also be programmed via a script that organizes DDR partitioning and data access sequences needed by the DATCAP coprocessors 206.

Thus, according to an embodiment of the present invention, with respect to the collection of large volume image data (which may include lidar and radar data) from the second plurality of sensors 202 each DATCAP co-processor 206 is controlled via capture sequencer 210. The capture sequencer 210 is communicatively connected in turn to the state management logic of the state vector module 210 which controls the capture sequencer 210 with bit level values in registers. The capture sequencer 210 and the plurality of DATCAP co-processors 206 connect to memory controllers 208. According to an embodiment of the present invention, each DATCAP co-processor 206 is connected to a single memory controller 208. In one embodiment, capture sequencer 210 and the plurality of DATCAP co-processors 206 send signals related to trigger information (described below) to memory controllers 208. As previously indicated, DATCAP coprocessors 206 are connected to the state vector component 112, perform metatagging described above and route the metatagged data to a corresponding memory controller 208. The memory controller 208, in turn, sends the metatagged machine vision data to a particular DDR array 214*b*.

Still referring to FIG. 2, digital logic partition 203 may further include one or more co-processing components 216 configured to offload computational tasks associated with pointing a particular image sensor 202 at a desired location in an active mobile platform system while guiding the system geometry to a desired location along a desired path. Collectively, these calculations related to desired system path and desired pointing location and conversion to DCM (discrete cosine matrices) and motion profile calculations for sensor pointing comprise a task called pointing. This computationally expensive task needs to be updated very regularly and precisely and relies completely on a plurality of the state vector parameters. It is noted that the results of the pointing calculations are placed back into the state vector and utilized by the motor control systems 220. In accordance with an embodiment of the present invention, pointing calculations are performed by the pointing coprocessor 226. In other words, the pointing coprocessor 226 calculates update DCM and trajectories for the motor controllers 220 to follow. It is noted that the pointing processor 226 is typically given a target location, line or spline to follow by the application processor 106 via the state vector module 112. According to an embodiment of the present invention, the pointing coprocessor 226 can perform the above-described tasks without any oversight of application processor 106.

In one embodiment, gyro/accelerometer interface 222 is configured to process output of a plurality of gyroscope/acceleration sensors. Accelerometers may be used to sense acceleration of the mobile platform they are attached to (e.g., gravity, sudden starts/stops, motion induced variance). The gyro sensors measure the rate of rotation. Gyro/accelerometer interface 222 may be either an analog, pulse-width modulated (PWM), or digital interface. The gyro/accelerometer sensors are preferably placed on one of the moving components of the mobile platform and coupled to the system based on the actual current location and rotation of the sensor in the system at the time of measurement. This complicated timing relationship and accurate update timing is a major source of system errors which may compounds geometrically. For example, the coupling of one axis to the next creates compounding inverse DCM derotation of each axis in a gimbal of computerized multilink arm or rotation of a vehicle bound or human worn system while trying to resolve where a particular sensor is located and pointing to (6 degrees of freedom) in a 3D space. The integral of rate cross acceleration sensors offer this 6 DoF (6 degrees of freedom) calculation when a starting position is known. The fidelity and drift of the sensors clearly affect outcome as does the correctness of the simultaneous state acquisitions of the system. In various embodiments, the Gyro/Accelerometer interface 222 combines multiple inputs from a potential variety of system gyro and accelerometers, and encoder data to perform Kalman filtering to make better estimations. It is noted that gyro/accelerometer coprocessor 222 also relies on the state vector module 112 for data input and output.

The purpose of an INS component 228 is to compute and provide a navigation solution to a machine vision mobile platform on which it is installed.

A navigation solution consists of the Position, Velocity and Attitude (PVA) and Roll Pitch Yaw of the INS 228 with respect to the Earth. INS component 228 computes a navigation solution based on the dead-reckoning principle: given the initial position, velocity and altitude of the mobile platform (referred to as "initial conditions"), continuous readings from the devices (i.e., sensors) 120 of the platform are used to keep an updated navigation solution even and particularly when the platform is in a dynamical (rotating) state. Errors in the dead reckoning approach can be mitigated by Kalman filtering techniques that utilize GPS position updates. INS component 228 preferably is directly coupled to state vector module 112 and may utilize the state vector module 112 as an input and output buffer interface. It is noted that application processor 106 asserts several other navigation control and data states to INS component 228 through registers interface 108, for example.

In accordance with an embodiment of the present invention, motor control interface 220 is disposed within the digital logic partition 203 and communicates with the first plurality of sensors 120 (shown in FIG. 1) via DATCC interface 110 and via the state vector module 112. Motor control interface 220 may ingest both positional and motor state data directly from the state vector module 112. It is noted that a conventional system with an external motor controller acts differently. The motor controller is generally self-sufficient. In other words, typically, positional data for the axis being controlled is ingested by the motor controller directly. Normally, the motor controller measures real time torque, current, voltage and interprets serial or analog commands from the application processor 106. The motor controller generally ingests encoder/sensor data directly and then the application system (i.e., application processor 106) must periodically query the motor controller via a command and response mechanism. The non-deterministic response of many motor controllers to a query by the application processor 106 is very disadvantageous with significant performance impact and significant latency substantially guaranteed.

Advantageously, various embodiments of the present invention contemplate that motor control interface 220 preferably ingests the sensor/encoder data directly, via a DATCC co-processor 110 and the state vector parameter sharing that converts the ingested data into an appropriate format, calculates velocity, acceleration, coil currents, coil voltages, inertial data and positional information of an axis, then updates a Kalman filter to estimate local parameters and stores the calculated data in the state vector module 112. Based on trajectory parameters and distance to a particular target in an axis calculated by the pointing processor 226 or application processor 106 the motor controller 220 continues to calculate current output phase and amplitude to drive a motor along it trajectory towards its destination. It is emphasized that, just like other co-processing components 216, the motor control interface 220 utilizes the state vector module 112 for storing generated data. Ethernet processing offload components may include Ethernet routing unit 224 and an Ethernet computation unit 230 which will be described in greater detail below in conjunction with FIG. 5.

Advantageously, the configuration illustrated in FIG. 2 of a plurality of DATCAP coprocessors 206, separate memory controller(s) 208 and separate physical memory, such as DDR memory 214 act to offload a plurality of data moving functions from the application processor 106. These data moving functions relate to movement of the acquired image data. Further, a novel system architecture disclosed herein provides these complex data moving functions as a system service allowing a user of the platform the ability to write software in the application processor space using common techniques where preprocessed, properly (accurately and deterministically) metatagged data is available. Of paramount importance to a mobile machine vision system is the positional knowledge and direction and/or stabilization of where a sensor is placed and oriented in space (both position and pose), various calculations with simultaneous motor axis control and the accurate knowledge of sensor input timing, as well as very accurate matching of image data to the position and pose data over the various data collection periods.

Figure 3:
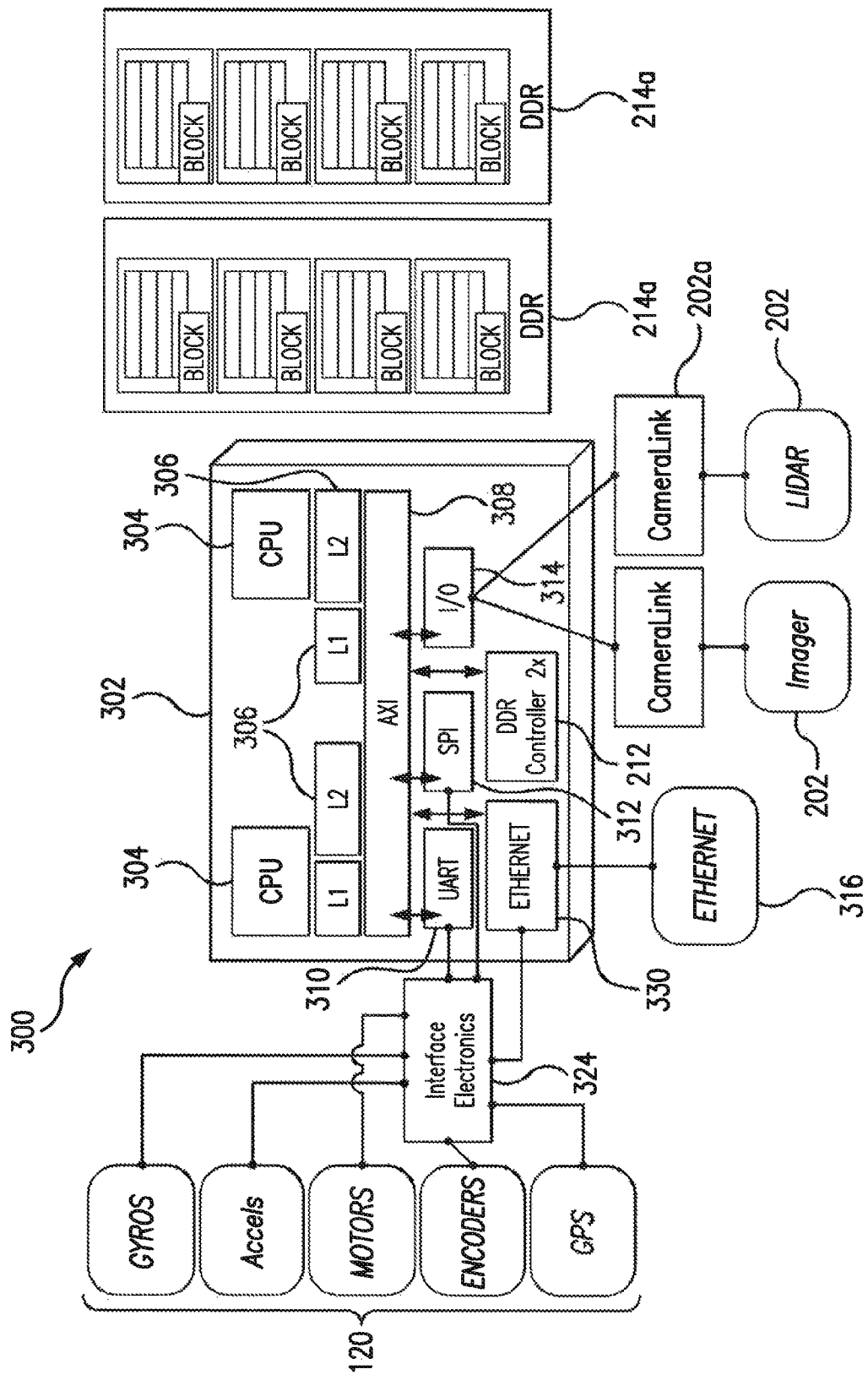
FIG. 3 is a system diagram illustrating a physical model of a conventional multicore integrated computer system for processing machine vision data on a mobile platform.

FIG. 3 is a system diagram illustrating a physical model of a conventional multicore integrated computer system for processing machine vision data on a mobile platform. As shown in FIG. 3, in this implementation a plurality of devices 120 common to a mobile machine vision platform such as, but not limited to, gyroscopes, accelerometers, motors, encoders, GPS devices are communicatively coupled to a single integrated circuit 302 via interface electronics 324, such as bit-level interface, for example. This bit level interface converts signals in a manner compatible with standard microprocessor peripheral interfaces, such as UART-based 310, SPI-based 312, I/O or similar interfaces.

The integrated circuit 302 may comprise a multi-core processor having a plurality of processors 304 and having an integrated level 1 (L1) cache and level 2 (L2) cache 306. The entire processor subsystem illustrated in FIG. 3 maps to elements 102 in FIGS. 1 and 2. In other words, the application coprocessor system 106 in FIGS. 1 and 2 is shown in FIG. 3 as elements 304, 306, 308, 310 and 314 described herein. A multicore system 300, illustrated in FIG. 3 merely for comparison purposes, runs an operating system and thus is subject to very strict rules of threading, scheduling and sharing data and memory access, including compliance with established programming concepts and assumptions. Various components of the integrated circuit 302 are interconnected by a bus interconnect, which falls under the broader umbrella of an "on-chip interconnect" (e.g., crossbar interconnects and the like), such as AXI 308.

Integrated circuit 302 also includes a universal asynchronous receiver/transmitter (UART) 310, SPI interface 312 and Ethernet interface 330. All devices 120 are connected through any of shown interfaces 310, 312, 314. The high data rate sensors, such as image sensors 202, are connected to the high speed AXI data bus 308 via digital IO 314 that enables streaming of image data to system's memory, such as DDR 214*a*. It is noted that different types of image sensors 202 may have different physical interfaces typically configured to convert acquired image data into a digital datastream transmitted to the AXI bus 308.

Relying on this conventional system architecture the running operating system must ensure to provide a portion of the compute time to each asynchronous task/interruption coming from every sensor 120 thru any peripheral interface 310 312, 314 and 330. The operating system also must allocate memory access to a monolithic memory system (OS typically only sees one big block of DDR 214*a*) for each small memory update to a state vector. During this memory allocation, the OS must typically interrupt computations performed by other threads, causing large amount of memory churn and creating L1 and L2 cache 306 "misses" on these context switches. These interrupts may occur at rates of ten thousand per second. Accordingly, such context switches and interruptions are computationally expensive and can consume the entirety of the CPU resources just in data acquisition. The programming model of this exemplary conventional system is shown in FIG. 4.

Figure 4:
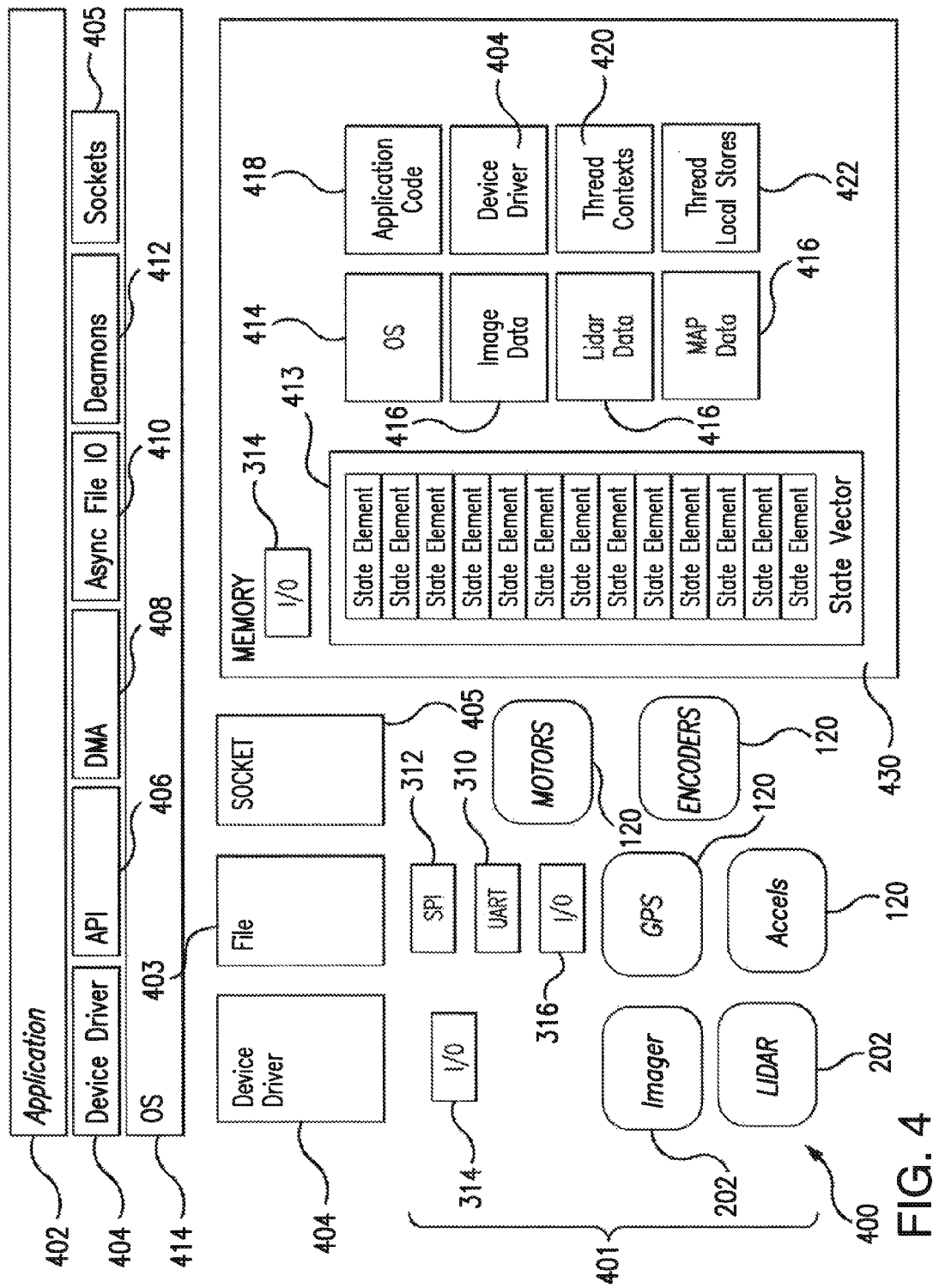
FIG. 4 is a system diagram illustrating a programming model corresponding to the conventional physical model of FIG. 3.

FIG. 4 is a system diagram illustrating a programming model corresponding to the conventional physical model of FIG. 3. As illustrated in FIG. 4, programming model 400 is categorized into different layers. The hardware platform layer 401 of integrated circuit 302 specifies the physical attributes of the chip 302 such as physical peripheral interfaces 310-316, these peripheral interfaces are typically communicated with via a device driver abstraction 404, a file I/O abstraction 403 or a socket abstraction 405. The application code running in the application layer 402 of the operating system 414 can only interface with the abstraction offered in components 403-405. The operating system 414 operates based on the states presented in the listed abstraction layer elements 403-405. The operating system 414 allocates slices of computing time via the abstraction layer elements 403-405 and provides interrupt handling to implement various system functions. It is noted that typically the operating system 414 operates based on somewhat generic rules of prioritization and scheduling and based on somewhat strict rules with respect to memory coherence between various threads. Thus, in conventional computer systems, the operating system 414 plays a central role in the overall system performance. However, in conventional mobile platforms several performance chokepoints arise in that a single memory system 430 is used with heavy performance penalties being applied by the rapid interrupt demands typical of various mobile vision platforms.

One or more applications 402 may call any application programming interface (API) 406, device driver 404, socket 405, asynchronous file IO interface 410, daemon service 412 and may be able to access a direct memory access (DMA) buffer 408. Daemon services 412 are programs that run continuously or in the background and handle periodic service requests received by application 402 and add more complexity to interrupt latency and determinism variance. At the next layer, operating system 414 may utilize a plurality of device drivers 404, files 403 and network sockets 405. It is noted that each thread calling each interface creates a schedulable event in the OS 414 that needs to be serviced. Furthermore, each interrupt trapped by the OS 414 needs to be assigned to a software callback function attached to a particular thread that needs to be scheduled to act on the new data presented to the system. This architectural approach leads to a fairly large number of resource sharing conflicts between all sensors and interrupts competing for processing time, thus affecting timely updates of state vector information. Even slight timing variations in input interrupts can lead to chaotic behavior of the entire mobile platform.

It is noted that illustrative programming model 400 depicted in FIG. 4 contemplates that state vector information 413 utilized by various components of the mobile machine vision platform is stored in the shared memory 430 along with other types of information such as, but not limited to OS data 414, application code 418, image, LIDAR and map data 416, thread execution context 420 and thread local storage 422.

As the operating system 414 must react to various memory location updates happening essentially simultaneously and asynchronously, the memory controller is very busy swapping out thread contexts and substantially constantly refreshing cache as the data accesses are all over the memory space typically causing great conflicts between multiple threads attempting to write to the single memory space 430 managed by the operating system 414. This bottleneck worsens in a multicore system as more cores are added and as memory coherency is further challenged. It is noted that the programming model illustrated in FIG. 4 is completely dependent on the application processing implementation details and the numerous specific details related to operating system functions, individual device drivers and individual sensors.

Figure 5:
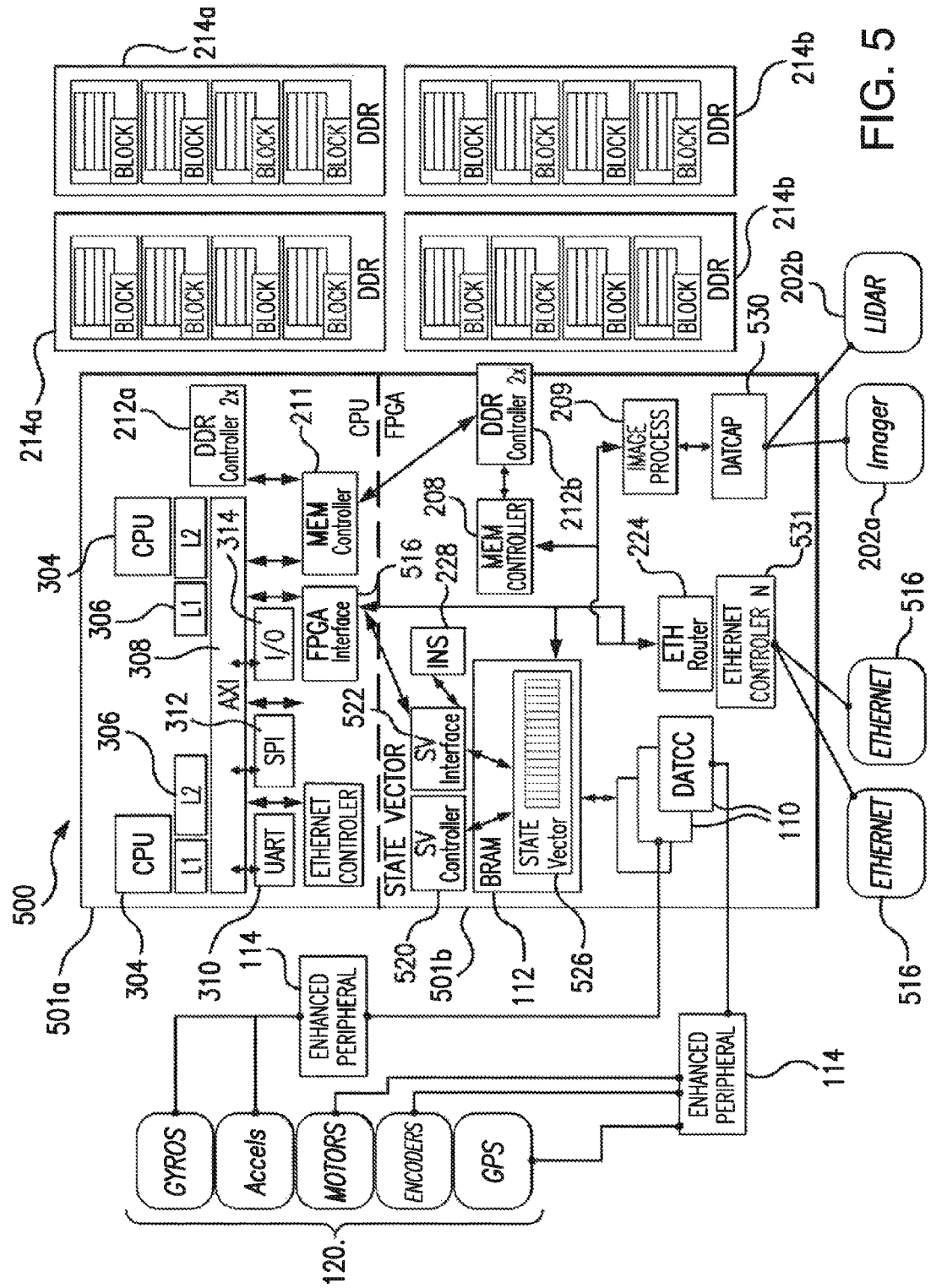
FIG. 5 is a system diagram illustrating a physical model of an integrated computer system for processing machine vision data on a mobile platform implemented as a System-on-Module (SOM) in accordance with an embodiment of the present invention.

FIG. 5 is a system diagram illustrating a physical model of an integrated computer system for processing machine vision data on a mobile platform implemented as a System-on-Module (SOM) 500 in accordance with an embodiment of the present invention. In one embodiment, SOM 500 may include a plurality of partitions, such as a first (e.g., CPU) partition 501*a* and a second (e.g., FPGA, digital logic) partition 501*b*. As shown in FIG. 5, in this implementation a first plurality of devices 120 such as, but not limited to, gyroscopes, accelerometers, motors, encoders, GPS devices are communicatively coupled to one or more DATCC enhanced peripheral interfaces 114 which are in turn coupled to one or more DATCC coprocessors 110. A specific implementation of a DATCC is contained in the functionality of SPI management system and is further described in co-pending application Ser. No. 14/461,086 incorporated by reference herein.

As shown in FIG. 5, components of the first partition 501*a* in the present embodiment have substantially the same configuration as the integrated circuit 302 of a conventional embedded system (shown in FIG. 3). Therefore components identical or similar to those of the conventional integrated circuit 302 will not be described again. With respect to the second partition, advantageously, in this embodiment the state vector module 112 may be implemented in hardware as an integrated system of components and interfaces. In one embodiment, the state vector module 112 may include a block random access memory (BRAM) 526, a State Vector (SV) controller 520 and a plurality of SV interfaces 522 that communicatively connect to each co-processing component interface (e.g., INS 228) that accesses state vector information. It is noted that other co-processing components (not shown in FIG. 5) within second partition 501*b* may have similar interfaces to the state vector module 112. In one embodiment, BRAM 526 comprises a multiport memory that stores and distributes the system parameters (i.e., state vector parameters) at rates in excess of the physical measurements typically available in conventional mobile platforms. The state vector controller 520 is configured to operate without the oversight of application processor 106. However, it is noted that state management logic included in the state vector module 112 is capable of communicating with a device driver in the application processor's 106 operating system to provide the application processor 106 access to the state vector data (read/write) in a low (substantially zero) overhead and in a safe, non-blocking manner. Advantageously, the state management logic also provides all other co-processors (such as DATCC co-processors 110, DATCAP co-processors 206, navigation co-processors, etc.) the same non-blocking, high performance behavior. DATCAP co-processor(s) 206 receive data provided, for example, by the second plurality of sensors, such as LIDAR devices 202b. In some embodiments inter-partition communication may be performed via FPGA interface 516. It is noted that at least in some embodiments, different sets of DDR arrays (214a and 214b, respectively) may be associated with each partition. The information may be routed to an appropriate DDR block 214 by one of the memory controllers 208 and 211.

As previously indicated, the first plurality of sensors 120 communicates via enhanced peripherals interface 114 with DATCC processor(s) 110 that handle high frequency interrupt low bandwidth inertial, positional and auxiliary data and provide updates to the state vector module 112 using the SV interfaces 522. The second plurality of sensors (i.e., image sensors 202a and 202b) are ingesting high bandwidth image data using DATCAP components 530 that comprise bit-level interfaces 204 and DATCAP coprocessors 206. The DATCAP components 530 offer the aforementioned metatagging services via SV interfaces 522. The DATCAP components 530 interact directly with image processing pipeline components 209 described above in conjunction with FIG. 2. Memory Controller 208 is configured to route tap points from the image processing pipeline components 209 to various DDR memory locations 214b. A tap is an analysis point within a set of received image data. The first pipeline tap point is equivalent to routing raw data from the image forming sensor input.

In addition, various embodiments of the present invention contemplate utilization of Ethernet protocol as a communicative medium between the SOM 500 and various external components, as well as internal communicative medium within the digital logic partition 501b. Accordingly, SOM 500 may further include embedded Ethernet traffic offload engine comprising a routing element 224 and memory controller 208.

It is highly desirable for the application processor 106 and the application processor partition 102 running an OS to have access to a standard internet connection. Such internet connection enables the application processor 106 to support all of the standard features of an advanced operating system. The variety of standard services include, but are not limited to, very large SSL (Secure Socket Layer), telnet, FTP (File Transfer Protocol), rsync, DHCP (Dynamic Host Configuration Protocol), ARP (Address Resolution Protocol), HTTP (Hypertext Transfer Protocol), etc. These network services run as daemons 412 (or equivalent) and are loaded by the application processor 106. While simply connecting the Ethernet network to corresponding processor's interfaces enables these network services in a conventional mobile platform system, a serious problem may arise when the mobile platform system is asked to move large amount of image data using the same Ethernet connection 516. Such data transfer request forces the conventional mobile platform to use the operating system 414 for copying packet data from its controlled DDR memory 214, assembling packets of data and transmitting them to the Ethernet port 516 on a timed schedule. While utilization of the advanced DMA and AXI facilities reduces the load, but the resource consumption of the mobile platform typically remains to be very large. A similar condition arises when an external component wishes to send large amount of data to the SOM 500. Furthermore, it is highly desirable to route large data sets to various memory systems controlled illustrated in FIG. 5 from external sources. An embodiment of the present invention makes it possible to use the port number of a service to route the Ethernet packets to either the application processor partition 501a or the digital logic partition 501b. In addition, it is highly desirable for the application processor 106 to control the transfer of large bandwidth data (i.e. image data) from the digital logic partition 501b to one or more external IP addresses.

In view of the above, various embodiments of the present invention contemplate that Ethernet router 224 has four primary functions. These functions include: (1) routing Ethernet packets to the application processor 106 based on an input packet's source IP address, destination IP address and port number; (2) routing Ethernet packets from the application processor 106 to the external component based on the destination and source IP addresses and port number information; (3) routing Ethernet packet data to the digital logic partition's 501b memory based on input packet's source and destination IP addresses, port number and a customized header placed in each Ethernet packet; (4) routing various data blocks placed in DDR memory arrays 214b to destination IP addresses and port numbers, wherein the source data memory locations should be programmable by the application processor 106. These implementation goals provide a complete Ethernet stack to the SOM 500, while simultaneously providing SOM 500 ability to route data from the digital logic partition 501b to a plurality of destination IP addresses without application processor's 106 overhead.

According to an illustrative embodiment of the present invention, SOM 500 appears to be a standard Ethernet connection to the application processor 106 and various external network devices, but offers an API (e.g., function calls via the FPGA interface 516) enabling the application processor 106 to identify a target memory location and data size in the digital logic partition's DDR array memory space 214b that can be transmitted via Ethernet network to any IP address desirably by the application processor 106. Furthermore, the aforementioned API can configure this transmission to happen automatically based on a particular capture sequencer 210 event. More specifically, according to an embodiment of the present invention, the entire SOM 500 can be considered as having one IP address, for example, IPbase. The external plurality of connections can simply be grouped at IPX (Internet Packet Exchange) and Ethernet Router 224 can assemble, decode and route packets with IPbase, and IPX easily in real time using various on chip resources.

In addition, the Ethernet router 224 is extended to enable the use of standard sockets for the Application processor 106. The Ethernet router 224 decodes packets addressed to reach the application processor 106 and reconstructs the packets to redirect them to the Ethernet controller 531, as expected by the OS 414 implementing basic socket connections. The Ethernet router 224 then spoofs the IP connection at a signal level and effectively requires no changes to any standard socket behavior (except for port being mapped to digital logic partition 501b) performed by the application processor's OS 414. The Ethernet router 224 maintains a list of ports with targeted destinations in the digital logic partition 501b for which it will process packets. This novel feature provides the SOM 500 complete Ethernet compliance.

According to an embodiment of the present invention, incoming packets targeted at memory locations in the DDR arrays 214b are handled differently by the Ethernet router 224. In these cases, the Ethernet router 224 first evaluates the input packet's source and destination IP addresses and port numbers, then decodes the packet header to determine digital I/O bank, requested memory location and total transfer size. Next, the Ethernet router 224 verifies validity of the received packet and may use any suitable encryption technique. If the Ethernet router 224 is satisfied with the packet validity, it next buffers the packet data and sends a transfer request to the DDR arrays 214*b* via the memory controller 208. In response to the received request, the memory controller 208 transfers the payload data included in the packet to the digital logic partition's DDR memory space 214*b*. This achieves the above specified function of Ethernet router 224 directed to data transfer into digital logic's 501*b* memory space 214*b* without application processor's 106 overhead.

The Ethernet router's 224 function of data transfer from digital logic partition's 501*b* memory space 214*b* to external Ethernet ports without application processor's 106 overhead can be implemented as follows. It is noted that the application processor 106 usually configures the capture sequencer component 210 that triggers image data acquisitions based on timers and/or state vector status information. It is further noted that application processor's 106 is aware of image processing pipeline 209 configurations, of current image processing tap and its mapping to digital logic's 501*b* memory location 214*b*. Thus, a timestamp corresponding to a particular instance in time when new image data is available in digital logic's 501*b* data space is known and entered as a capture event offset in the capture sequencer 210. The application processor 106 can define the event that triggers the automated data movement and the particular memory location, data size and the destination IP for the packets. In one embodiment, these parameters can be communicated to the Ethernet router 224, via the application processor's 106 API function call. The trigger event follows the capture sequencer's 210 event and the Ethernet router 224 sends a data transfer request to the memory controller 208 identifying the memory blocks that need to be retrieved. The Ethernet router 224 typically requests substantially large memory blocks and immediately transmits them to the Ethernet controller 531 facing external Ethernet network. This exemplary embodiment provides an advantageous approach to meeting the above specified function of Ethernet router 224 with near zero overhead placed on application processor 106 with respect to large data transfer. Similarly, an exemplary embodiment of the present invention provides an ability to send state vector data using an IP port by merely providing a separate API function for sending the state vector data.

Generally, the internal fabric of the digital logic partition 501*b* is much faster than the Ethernet's baud rate, however, the Ethernet router 224 does need to schedule access with the asynchronous nature of messaging events. According to an embodiment of the present invention, the Ethernet router 224 may implement a simple scheduler and a first-in-first-out (FIFO) buffer of packet I/O for various interfaces. For example, the Ethernet router 224 can create two FIFO buffers per each interface (input and output) for the application processor 106, the digital logic 501*b*, and the state vector interface 522. In one embodiment, these buffers can be implemented in BRAM 526 and can have a size substantially equivalent to the size of few large data packets (e.g., 6 Kbytes).

To reiterate, various embodiments of the present invention contemplate utilization of Ethernet protocol as an internal and external communicative medium for SOM 500. In an embodiment, Ethernet router 224 interacts with various reconfigurable system memory controller components described above. It is contemplated that one or more applications executed by application partition 102 could request the Ethernet controller 531 to transfer a block of memory data from memory 214*b* to the Ethernet port 316 by adding corresponding header and CRC information to a corresponding request. Thus, effectively the disclosed architecture enables the application processor 106 to stream large data flows to Ethernet 316 with negligible processing load on the application processor 106. Using predefined ports and commands from the application processor 106, the Ethernet controller 531 can stream data from the separate RAM in the reconfigurable system to the network. Advantageously, the state vector controller 520 also can stream data directly to an Ethernet network using the Ethernet controller 531 without processing overhead of application processor 106, yielding fidelity and deep debug capability. In various embodiments, SOM 500 may include a plurality of Ethernet controllers 531 and Ethernet routers 224 thus providing separation of data streaming capability to multiple Ethernet connections 516. Advantageously, the disclosed architecture is capable of reducing application processor's 106 load at least 100× using modern SOC FPGA/ARM processing components.

Figure 6:
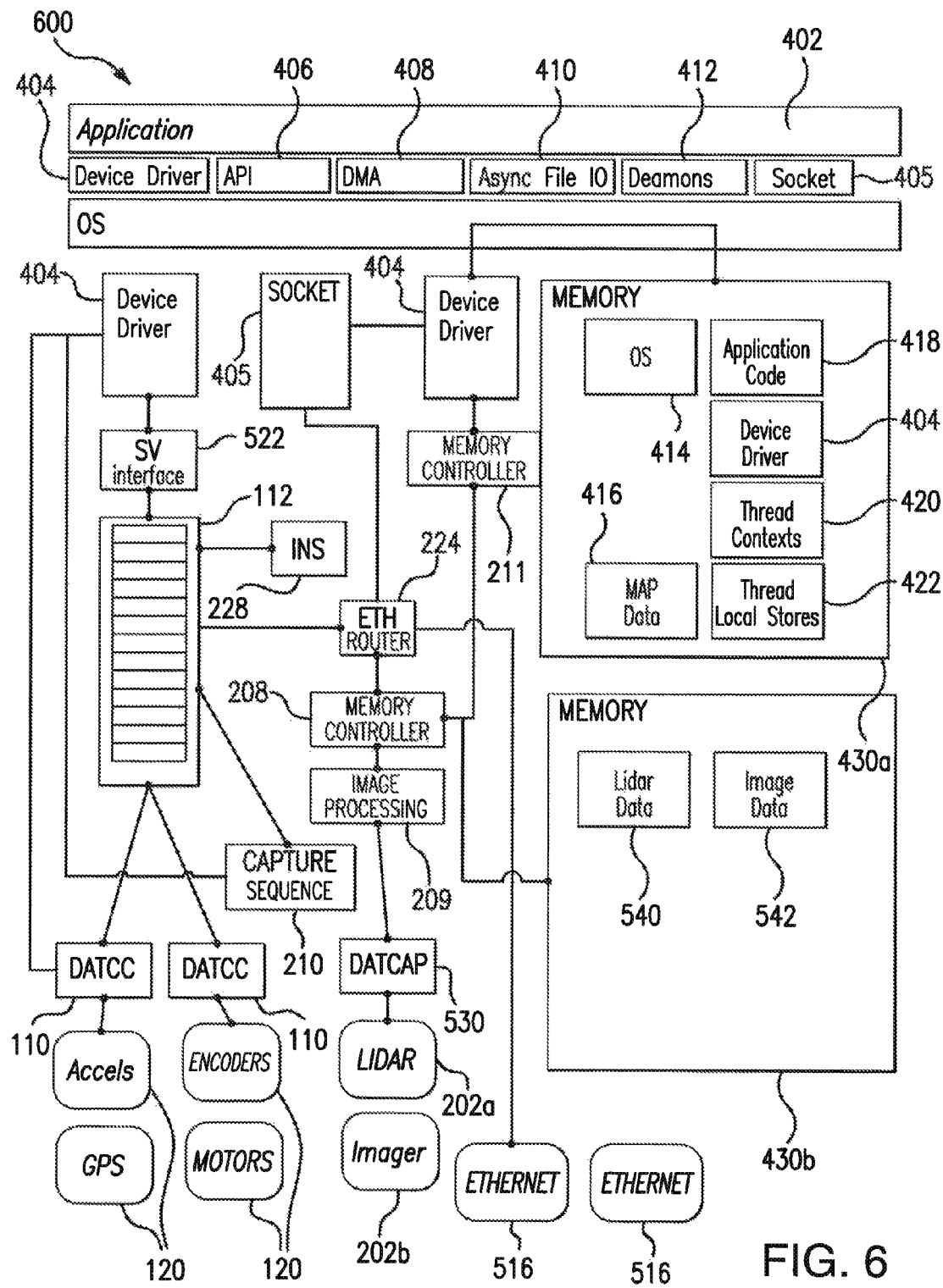
FIG. 6 is a system diagram illustrating a programming model corresponding to the physical model of FIG. 5 in accordance with an embodiment of the present invention.

FIG. 6 is a system diagram illustrating a programming model corresponding to the physical model of FIG. 5 in accordance with an embodiment of the present invention. As illustrated in FIG. 6, programming model 600 is categorized into different layers. The hardware platform layer 601 of SOM 500 includes embedded state vector module 112 communicatively coupled to a plurality of interfaces. In this embodiment all components of the hardware platform layer 601 are configurable and commanded via device driver 404. Also, in the arrangement illustrated in FIG. 6, LIDAR data and image data are preferably stored in a dedicated external memory portion 430*b*, separately from application and OS level data. It is noted that embedded state vector module 112 significantly reduces application processor's 106 load, improves performance of the system as well as accuracy of the collected measurements. DATCC 110 and DATCAP 206 represent co-processors shown in FIGS. 1 and. 2, respectively, wherein DATCC 110 comprises hardware logic configured to collect input data and control output data by running its own program 110*p* described above and DATCAP 206 comprises hardware logic configured to perform ingestion of high-bandwidth image data from a streaming data source without application processor's 106 overhead by utilizing data capture sequencer 210 and memory controller 208. Major workloads of image processing are implemented in the image processing pipeline components 209. The application processor 106 can configure and load a program for the coprocessor entity using the device driver 404. Such programs may include a DATCC program 110*p*, the configuration for a DATCAP 206 (e.g., a specific parameter file) and a sequencer configuration parameter set for capture sequencer component 210. The memory controller 211 is also configured with a memory access table and schedule that ensures efficient memory accesses. Likewise the Ethernet router 224 can be configured with a parameter set via an API function communicated through a device driver 404. The INS 228, Pointing 226, Gyro interface 222 and Motor Control 220 co-processing components (shown in FIG. 2) may utilize conventional fixed function with a parameter table and status bits. The status bits for these co-processing components are used by the application processor 106 to monitor system's health and require very little oversight.

The availability of the state vector data to the application processor 106 can also be utilized to monitor system state but usually has no critical timing requirements. Essentially, the application processor 106 configures the plurality of coprocessors, starts them, then merely controls macro events and monitors the overall status of the mobile platform. The advantages of the disclosed architecture are further discussed by considering how interrupts are removed from the application processing interface.

Figure 7:
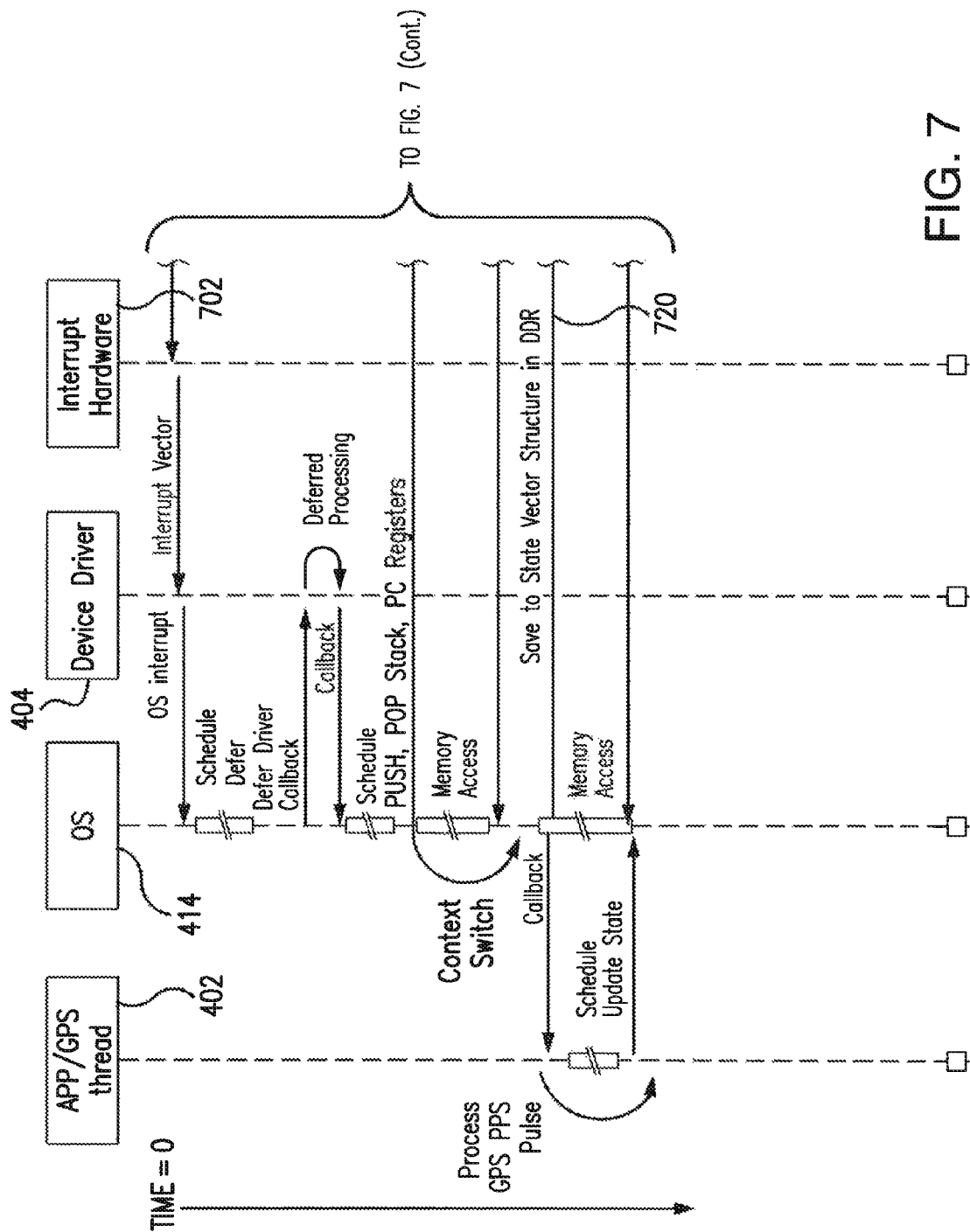
FIG. 7 illustrates a prior art procedure for data acquisition in the execution of a conventional multitasking operating system using the conventional hardware configuration of FIG. 3 and programming model of FIG. 4.

FIG. 7 illustrates a prior art procedure for handling interrupts in the execution of a conventional multitasking operating system. Elements in the FIGS. 7 and 8 are illustrated for simplicity and clarity and have not necessarily been drawn to scale. FIG. 7 illustrates the occurrence of interrupts from various sensors 120 (i.e., a pulse signal 704 from a GPS sensor 120), the handling of received interrupts by an interrupt hardware 702, device driver 404, operating system 414 and application 402. A single interrupt being handled in shown in FIG. 7 and briefly illustrates the interrupt handling issues commonly known to practitioners in the art. The actions illustrated FIG. 7 are performed approximately ten thousand times per second in conventional systems. This sequence diagram illustrates a mechanism to handle of the interrupt vector and any other information required for interrupt processing related to an update 720 of a single value in the state vector module 112. In this conventional implementation the application processor 106 is designed to perform data acquisition tasks that are frequent having substantially small data size, while performing large data movement and calculation tasks at a slower rate, The example illustrated in FIG. 7 is a small subset (just one non synchronous parameter) of a complete pattern of data acquisitions typically occurring in a moving machine vision system. Typical number of interrupts can easily reach hundreds of parameters, and ten thousand interrupts per second. Cache misses and thread conflicts for data reads and writes further complicate analysis and timing errors that lead to poorly performing systems. The OS 414/Memory controller objects 430 show the scheduling and memory movement aspects and randomness of the interrupt events. Another complicating aspect is OS's 414 mutex/semaphore conflict resolution mechanism that is application code dependent.

FIG. 8 illustrates a novel procedure for handling interrupts in the execution of a conventional multitasking operating system utilized by an integrated system for processing machine vision data on a mobile platform, in accordance with an embodiment of the present invention. In contrast to conventional mechanism illustrated in FIG. 7, this approach allows a plurality of sensors 120 to update data in the state vector module 112 without any involvement of the conventional interrupt handling routine in either push or pull mode. In either push or pull, a DATCC co-processor 110 handles the interface to a plurality of sensors 120 and may propagate updates originated from other sensors 120 via the state vector module 112. It is noted that operating system 414 may receive an interrupt 708 from an internal timer determining that application thread 402 needs to run on a nominal schedule. The application 402 may simply read/write a group of values from/to state vector module 112 using a non-blocking interface. This approach eliminates mutex and semaphore related issues and enables retrieving all requested data in a continuous block and with deterministic timing as the data is placed in register space by the state vector module 112. Advantageously, in this case, all tasks involved in interrupt handling such as but not limited to callbacks 712, context switches 716, etc. are performed just once and the entire content of the state vector is communicated to the application thread 402 at step 810. Thus, live monitoring and status management tasks are greatly simplified.

In summary, various embodiments described above are directed to a machine vision system attached to a mobile platform. The system comprises a plurality of co-processing elements that are configured to acquire and assert data, offload data movement and computational tasks from system's application processor(s). These elements, acting in concert, enable low power, accurate, high throughput machine vision systems on moving platforms. The fundamental aspects of the various embodiments of the present invention lead not only to increased efficiency, but ready implementation as a scalable, accurate machine vision system utilizing large data sources (imagers), accurate inertial and positional measurements and calculations and well-coordinated motor control systems upon which the pluralities of sensors are mounted.

The techniques described herein are exemplary, and should not be construed as implying any particular limitation of the certain illustrated embodiments. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. An integrated computing system for processing machine vision data and performing active control of a mobile platform, the computer system comprising:
    a first plurality of sensors configured to acquire inertial and positional data related to the mobile platform;
    a first plurality of co-processors communicatively coupled to the first plurality of sensors, the first plurality of co-processors including a hardware logic configured to control the acquisition of the inertial and positional data and configured to analyze the acquired inertial and positional data;
    a second plurality of sensors configured to acquire image data related to the mobile platform;
    a second plurality of co-processors communicatively coupled to the second plurality of sensors, the second plurality of co-processors including a hardware logic configured to control the acquisition of the image data and configured to analyze the acquired image data;
    a plurality of arrays of memory blocks for storing the acquired image data;
    state vector module to perform state management operation for the acquired inertial and positional data in a local memory, wherein the state management operation is performed using a state vector and wherein the state vector module coordinates sharing and updating the acquired inertial and positional data in a parallel fashion between the first and second plurality of co-processors; and
    a plurality of memory controllers configured to control access to the plurality of arrays of memory blocks, wherein the plurality of memory controllers are communicatively coupled to the second plurality of co-processors and communicatively coupled to the state vector module and wherein the plurality of memory controllers are further configured to control a plurality of image processing pipeline components configured to process metatagged data through a multi-functional pipeline.

2. The integrated computing system of claim 1, wherein at least the first plurality of co-processors, second plurality of co-processors, state vector module and the plurality of memory controllers comprise a system-on-module.

3. The integrated computing system of claim 1, wherein at least the first plurality of co-processors, second plurality of co-processors, state vector module and the plurality of memory controllers comprise a Field Programmable Gate Array (FPGA).

4. The integrated computing system of claim 1, wherein each of the second plurality of co-processors is communicatively coupled to each of the second plurality of sensors.

5. The integrated computing system of claim 1, wherein the hardware logic of the first plurality of processors is further configured to perform a plurality of movement control functions related to the mobile platform.

6. The integrated computing system of claim 1, wherein the state management operation is performed by the state vector module in a non-blocking manner.

7. The integrated computing system of claim 2, further comprising an embedded Ethernet packet routing controller.

8. The integrated computing system of claim 1, wherein the first plurality of co-processors is configured to establish one of the following operating modes: reset mode, sleep mode, runtime mode, chirp acquisition mode and init mode.

9. The integrated computing system of claim 7, wherein each of the plurality of arrays of memory blocks comprises at least one of flash memory, dynamic random access memory ("DRAM"), or double data rate DRAM.

10. An integrated computing system for processing machine vision data and performing active control of a mobile platform, the computer system comprising:
   a first plurality of sensors configured to acquire inertial and positional data related to the mobile platform;
   a second plurality of sensors configured to acquire image data related to the mobile platform;
   a system on chip comprising:
      a first plurality of co-processors communicatively coupled to the first plurality of sensors, the first plurality of co-processors including a hardware logic configured to control the acquisition of the inertial and positional data and configured to analyze the acquired inertial and positional data;
      a second plurality of co-processors communicatively coupled to the second plurality of sensors, the second plurality of co-processors including a hardware logic configured to control the acquisition of the image data and configured to analyze the acquired image data;
      state vector module to perform state management operation for the acquired inertial and positional data in a local on chip memory, wherein the state management operation is performed using a state vector and wherein the state vector module coordinates sharing and updating the acquired inertial and positional data in a parallel fashion between the first and second plurality of co-processors; and
   a plurality of arrays of memory blocks for storing the acquired image data, wherein the plurality of arrays of memory blocks is external to the system on chip; and
   a plurality of memory controllers configured to control access to the plurality of arrays of memory blocks, wherein the plurality of memory controllers are communicatively coupled to the second plurality of co-processors and communicatively coupled to the state vector module and wherein the plurality of memory controllers are further configured to control a plurality of image processing pipeline components configured to process metatagged data through a multi-functional pipeline.

11. The integrated computing system of claim 10, wherein each of the plurality of arrays of memory blocks comprises at least one of flash memory, dynamic random access memory ("DRAM"), or double data rate DRAM.

12. The integrated computing system of claim 10, wherein the hardware logic of the second plurality of co-processors is further configured to perform a metatagging function, wherein the metatagging function comprises (1) packaging the machine vision data received from the second plurality of sensors into a plurality of image data streams and (2) inserting into each image a metatag describing the corresponding image and wherein the metatagging function is performed in accordance with data localization needed to perform parallel processing of the plurality of data streams.

13. The integrated computing system of claim 10, wherein the local on chip memory comprises a multi port RAM.

14. The integrated computing system of claim 10, wherein the system on chip further comprises a data sequencing interface communicatively coupled to the second plurality of co-processors and the state vector module.

* * * * *